United States Patent Office

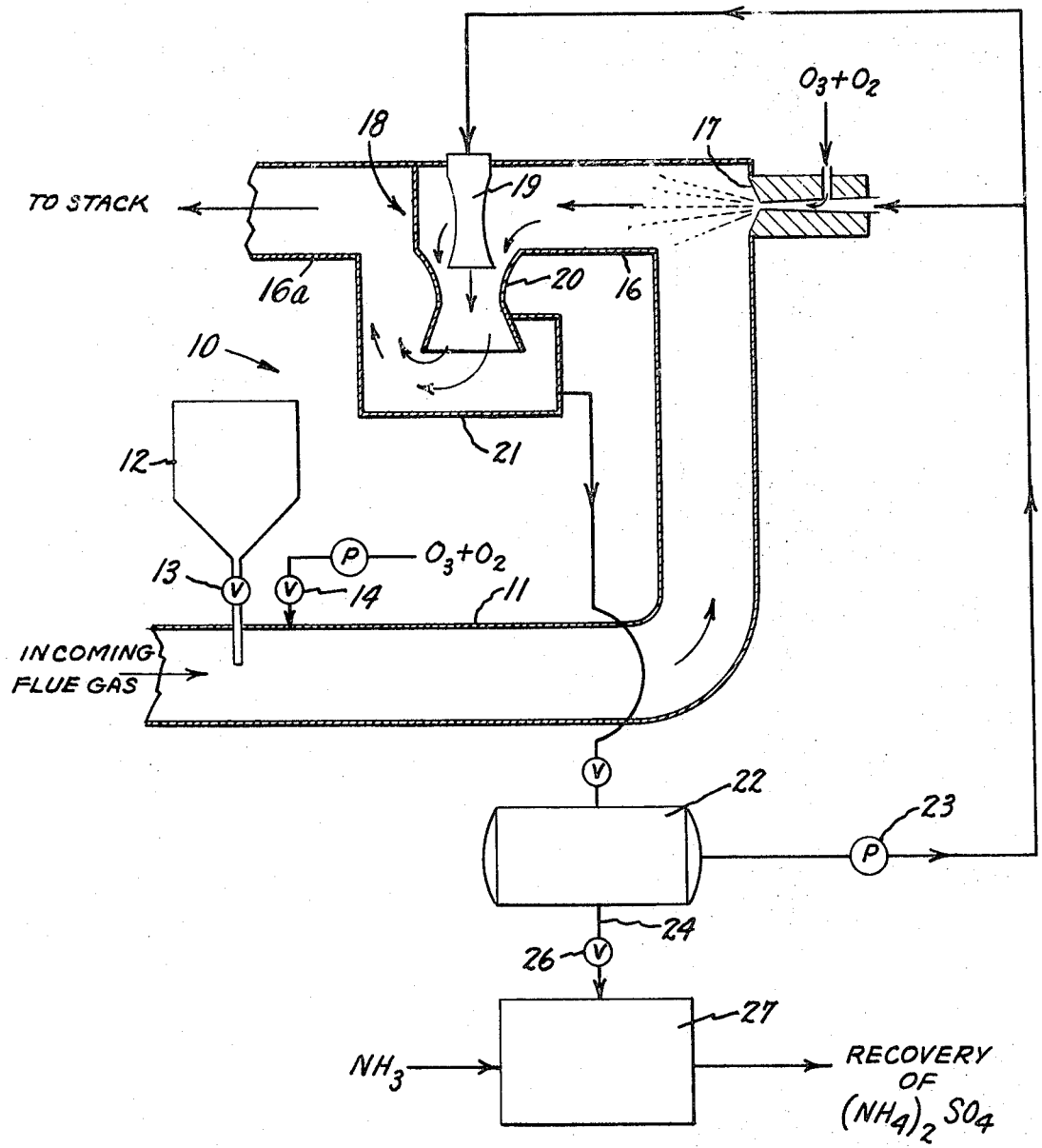

3,574,562
Patented Apr. 13, 1971

3,574,562
APPARATUS FOR REMOVAL OF SULFUR DIOXIDE FROM WASTE GASES
Masayuki Kawahata, Scotia, N.Y., assignor to General Electric Company
Filed Nov. 29, 1968, Ser. No. 779,807
Int. Cl. B01j 9/12, 9/16, 9/20
U.S. Cl. 23—284                                                                4 Claims

ABSTRACT OF THE DISCLOSURE

Apparatus for removal of sulfur dioxide from waste gases is connected to the exhaust of a flue gas system, in which a chemical reaction promoted by ozone is brought about between oxygen and sulfur dioxide both in the presence of solid catalyst and in the presence of catalyst in solution. Equipment at a series of stations may sequentially introduce into the hot gas flow (a) finely divided manganese dioxide, air (or oxygen) and ozone, (b) an ozone-entrained spray of an aqueous solution of manganese sulfate and (c) a jet of water or of the same aqueous solution to remove any manganese oxide powder or liquid particles entrained in the gas flow. The manganese sulfate solution is recovered and recirculated until it attains a concentration practical for sulfate recovery.

BACKGROUND OF THE INVENTION

Sulfur dioxide is a constituent of many waste gases such as smelter gases, offgases from many chemical processes, and stack gases from coal-burning furnaces. The total quantity of sulfur dioxide contained in waste gases may be very large, although its concentration in such gases may be very low. For example, a modern electric power plant having a capacity of 1,350,000 kw. will burn 15,000 tons of coal per day. The sulfur dioxide emission from such a plant (using coal containing about 3.5 percent sulfur) would amount to about 1,000 tons per day with the concentration of sulfur dioxide in the stack gases being about 0.3 percent.

Several processes based upon the catalytic oxidation of sulfur dioxide to produce sulfur trioxide, which in turn is used to form sulfuric acid, are known. Also, it is known that ozone promotes the catalytic oxidation of sulfur dioxide to sulfur trioxide in the presence of such a catalyst.

These prior art methods have employed either contact between gaseous reactants in the presence of a solid catalyst or contact between gaseous reactants in the presence of solutions of the catalyst material, but not both.

However, the art is still in need of a process and apparatus able to decrease the amount of oxidation catalyst required, produce higher throughputs, decrease operating costs and provide for better overall efficiency.

SUMMARY OF THE INVENTION

In contrast to prior art processes the method of the instant invention and apparatus therefor provide for simultaneously conducting the reaction between oxygen and sulfur dioxide gases both in the presence of entrained solid catalyst oxide and in the presence of aqueous catalyst sulfate. Also, of considerable importance is the provision and utilization in this invention of a very large number of contact-reaction sites moving along the path of gas flow.

Conduit means for receiving the hot flue gases (about 300° F.) are provided in combination with (a) means for introducing a particulate solid (preferably finely divided manganese dioxide) and means for introducing a gas mixture containing oxygen and ozone into the hot gas flow at a first station, (b) second means located downsteam of said first means for introducing an ozone-oxygen entrained spray of manganese sulfate solution, (c) third means located at an offset in the conduit means downstream of the second means for introducing a jet of water (or aqueous manganese sulfate solution) to aspirate from the gas flow the solid and liquid material entrained therein, (d) means in combination with the third means for collecting injected liquid and deentrained solids and liquids and means for recirculating the material so collected to said second means.

BRIEF DESCRIPTION OF THE DRAWING

The exact nature of this invention as well as the objects and advantages thereof will be readily apparent from consideration of the following specification relating to the annexed drawing, which schematically illustrates the gas flow and the treatment sequence therefor by the apparatus of this invention.

DESCRIPTION OF THE PREFERRED EMBODIMENT

As is shown in the drawing, the apparatus 10 of this invention is attached to the downstream (exhaust) end of a flue gas system or of the waste gas outlet of some industrial process having sulfur dioxide contained in the exiting gas flow. If desired, this apparatus could be located upstream of the dust collector (not shown). This gas flow is received by conduit 11. The usual gas temperature is about 300° F., but temperatures as high as 350° F. can be tolerated in this process.

At some position in conduit 11 near the waste gas inlet to the apparatus of this invention means are provided for introducing a particulate solid (preferably manganese dioxide particles of a size passing through U.S. Sieve #50) into the gas flow.

The finely divided solid may, for example, be distributed from hopper 12 via metering means 13. In addition duct means 14 is located adjacent hopper 12 to introduce ozone-containing air into the gas flow at a predetermined rate. The rates of admission of both the particulate solid and the ozone/oxygen containing gas are dependent upon the $SO_2$ content of the incoming gas and, in the case of the $MnO_2$, the rate of removal from the system of $Mn^{++}$. Thus, for a typical gas containing (dry basis):

|  | Percent |
|---|---|
| $SO_2$ | 0.35 |
| $O_2$ | 3.50 |
| $CO_2$ | 16.00 |
| $N_2$ | 80.00 |
|  | 100.00 |

The ozone concentration required would be in the range of 20–100 p.p.m. of gas flow. The temperature of the gas flow should not exceed about 350° F., because above this temperature the ozone decomposes too rapidly to be effective in the heterogeneous (gas-solid and gas-liquid) catalytic vapor phase reaction promoted by ozone. Should the temperature of the gas flow be too high it may be necessary to cool the gas flow, as by passage through a heat exchanger to heat the combustion air.

Downstream of hopper 12 and duct means 14, preferably at the turn from conduit 11 to conduit 16, a spray injector 17 is located. A solution of water and manganese sulfate with ozone-air entrained therein is introduced into the gas flow in very fine droplets as a spray.

Next, at still another downstream station, unreacted manganese dioxide powder and droplets of aqueous solutioned entrained in the gas flow are removed by means of ejector 18. A change in direction of the gas flow occurs in passing through the ejector housing in order that a water jet, which may be more of the catalyst sulfate solution, may be forced at high velocity from nozzle 19 into the body of the gas stream. This high velocity stream serves to de-entrain powder and liquid particles suspended in the gas flow, the liquid so injected and the de-entrained material being collected in sump 21. An aspirating action to encourage gas flow through the system results from the aforementioned fluid injection offsetting any decrease in thermal lift of the flue gas relative to stack height resulting from the cooling effect of the water jet. The gas flow, substantially free of sulfur dioxide andd entrained matter continues on its way to the stack to be released to the atmosphere or to additional treatment processes via conduit 16a.

In operation influent $SO_2$-containing waste gas enters conduit 11 and finely divided manganese dioxide, oxygen and ozone are added thereto. During transit of this flow through the apparatus various chemical reactions occur on the surface area of the manganese dioxide particles. Initially, particles of entrained $MnO_2$ particles, which are dry, serve as sites for the solid-gas catalyzed, ozone-promoted conversion of $2SO_2 + O_2 \rightarrow 2SO_3$ following adsorption of the $SO_2$ on the surfaces of $MnO_2$ particles. Further downstream (in conduit 16 and diffuser portion 20) those entrained $MnO_2$ particles, which become wet from water injected into the system and adsorbed over the surfaces of these particles, absorb reactants and provide sites for liquid-gas catalyzed, ozone-promoted reactions between $SO_2$ and $SO_3$ in the gas flow with water on the particles yielding sulfurous acid and sulfuric acid. Such sulfurous acid as may be formed is converted to sulfuric acid by further oxidation promoted by the presence of ozone. Sulfuric acid formed will in turn react with the $MnO_2$ particle to produce $MnSO_4$ which remains in solution on these particles.

In addition, droplets of $MnSO_4$ solution introduced via spray injector 17 provide sites for liquid-gas catalyzed, ozone-promoted reactions in which $SO_2$ is absorbed and oxidized to yield $SO_3$, which react with water in the droplet to produce $H_2SO_4$ in solution. Should such droplets encounter entrained particles of $MnO_2$, the ensuing reaction yields $MnSO_4$ in solution.

This conglomerate of reactions occurs in the gas transit through the apparatus of this invention with the result that the $SO_2$ content of the gas leaving ejector housing 18 has been greatly reduced and there is an accumulation of water, $MnO_2$ particles, $MnSO_4$ and $H_2SO_4$ in sump 21.

When the level of fluid in the sump 21 reaches some pre-selected level (or periodically, if desired) this liquid is transferred to tank 22 from which it can be pumped on demand, via pump 23 to supply liquid to spray apparatus 17 and ejector 18. When the manganese sulfate concentration in the injection solution has increased to such a point as to have utility as a by-product it may be removed through pipe 24 via valve 26. Although manganese ions are removed from system 10 in this manner, the requisite ion content is continually satisfied by the introduction of the manganese dioxide powder.

Liquid received by tank 27 may have $NH_3$ gas introduced as shown after which $(NH_4)_2SO_4$ can be recovered and used as fertilizer.

Since the total additional gas input in the form of air-ozone is less than about 2 percent of the gas flow, the application of this apparatus downstream of an existing installation should not complicate existing flow parameters.

If desired, the manganese dioxide particles may be replaced by inert powdered material in part or in full, however, the effectiveness of $SO_2$ removal is reduced. In the case of complete substitution for the manganese dioxide powder the replenishment of $Mn^{++}$ is accomplished by continually adding new $MnSO_4$ solution.

Therefore, by the relatively simple introduction of the apparatus of this invention in position to receive a gas flow containing $SO_2$ in objectionable quantities, the $SO_2$ content can be effectively reduced to provide a useful by-product without sacrificing gas flow velocity to produce an acceptable gaseous discharge.

What I claim as new and desire to secure by Letters Patent of the United States is:

1. Apparatus for the removal of sulfur dioxide from a gas flow comprising in combination:
   (a) conduit means having an inlet and an outlet for the passage of gas flow therethrough,
   (b) means in flow communication both with a source of finely divided solid matter and with said conduit means for introducing said solid matter into the passing gas flow,
   (c) means in flow communication both with a source of an ozone/oxygen gas mixture and with said conduit means for inserting quantities of said gas mixture into the gas flow to mix therewith,
   (d) means located downstream of said introducing and inserting means connected to said conduit means and in flow communication with a source of liquid having ozone/oxygen gas mixture entrained therein for injecting said liquid and entrained gas mixture into the gas flow,
   (e) ejector means in flow communication with a source of liquid located downstream of said liquid/gas mixture injecting means and directed into said conduit for mixing a stream of said liquid at high velocity and low pressure with the gas flow and simultaneously changing the direction of gas flow, and
   (f) means in flow communication with said ejector means for collecting the liquid introduced thereby as well as the entrained matter removed from the gas flow.

2. The apparatus for the removal of sulfur dioxide from a gas flow as recited in claim 1 wherein the means for introducing finely divided solid matter may be preset to deliver at a preselected rate.

3. Apparatus for the removal of sulfur dioxide from a gas flow comprising in combination:
   (a) conduit means having an inlet and an outlet for the passage of gas flow therethrough,
   (b) means in flow communication both with a source of finely divided solid matter and with said conduit means for introducing said solid matter into the passing gas flow,
   (c) means in flow communication both with a source of an ozone/oxygen gas mixture and with said conduit means for inserting quantities of said gas mixture into the gas flow to mix therewith,
   (d) means located downstream of said introducing and inserting means connected to said conduit means and in flow communication with a source of liquid having ozone/oxygen gas mixture entrained therein for injecting said liquid and entrained gas mixture into the gas flow,
   (e) ejector means in flow communication with a source of liquid located downstream of said liquid/gas mixture injecting means and directed into said conduit for mixing a stream of said liquid at high velocity and low pressure with the gas flow and simultaneously changing the direction of gas flow, (f) means in flow communication with said ejector means for collecting the liquid introduced thereby as well as the entrained matter removed from the gas flow, and (g) recirculating means for removing liquid from said collecting means and conducting such liquid to said liquid/gas mixture injecting means.

4. The apparatus for the removal of sulfur dioxide from a gas flow as recited in claim 3 wherein added means connected to the recirculating means are provided for removing solution therefrom.

References Cited

UNITED STATES PATENTS

| | | | |
|---|---|---|---|
| 2,718,453 | 9/1955 | Beckman | 23—2(.1) |
| 2,768,705 | 10/1956 | Isserlis | 55—241X |
| 2,829,955 | 4/1958 | Goedkoop | 23—2(.1)X |
| 2,926,999 | 3/1960 | Tarbutton et al. | 23—178 |
| 3,150,923 | 9/1964 | Bienstock et al. | 23—2(.1) |
| 3,411,864 | 11/1968 | Pallinger | 23—2 |
| 3,411,865 | 11/1968 | Pijpers et al. | 23—2(.1) |
| 3,436,192 | 4/1969 | Karlsson | 23—288 |
| 1,908,782 | 5/1933 | Pearce | 23—288(.3F)X |
| 2,943,920 | 7/1960 | Hoover | 23—284 |
| 3,442,603 | 5/1969 | Lazaros | 23—284X |

FOREIGN PATENTS

| | | | |
|---|---|---|---|
| 914,398 | 1/1963 | Great Britain | 23—2.1 |
| 1,009,191 | 11/1965 | Great Britain | 23—2.1 |

MORRIS O. WOLK, Primary Examiner

B. S. RICHMAN, Assistant Examiner

U.S. Cl. X.R.

23—277, 285, 288